(12) United States Patent
Gallup et al.

(10) Patent No.: US 6,761,865 B1
(45) Date of Patent: Jul. 13, 2004

(54) METHOD FOR SYNTHESIZING CRYSTALLINE MAGNESIUM SILICATES FROM GEOTHERMAL BRINE

(75) Inventors: Darrell L. Gallup, Santa Rosa, CA (US); Richard K. Glanzman, Lakewood, CO (US)

(73) Assignee: Union Oil Company of California, El Segundo, CA (US)

( * ) Notice: Subject to any disclaimer, the term of this patent is extended or adjusted under 35 U.S.C. 154(b) by 0 days.

(21) Appl. No.: 10/420,132

(22) Filed: Apr. 22, 2003

(51) Int. Cl.$^7$ .............................. C01B 33/22; C02F 1/60
(52) U.S. Cl. ........................ 423/331; 210/696; 210/737
(58) Field of Search .......................... 423/331; 210/696, 210/737

(56) References Cited

U.S. PATENT DOCUMENTS

| | | | | |
|---|---|---|---|---|
| 4,274,929 A | * | 6/1981 | Novak .......................... | 205/536 |
| 4,874,529 A | | 10/1989 | Featherstone et al. ...... | 210/713 |
| 5,290,339 A | | 3/1994 | Gallup et al. .................. | 75/712 |
| 5,665,242 A | * | 9/1997 | Gallup ......................... | 210/696 |
| 6,533,923 B2 | | 3/2003 | Lacombe et al. ............ | 208/108 |

OTHER PUBLICATIONS

Klien, "Geochemical Behavior or Silica in the Artesiuan Ground Water of the Closed Basin Area San Luis Valley, Colorado", Abstract of Thesis submitted to Colorada School of Mines, Nov. 1971.*
Eaton et al., "Significance in the Loss of Magnesium from Irrigation Waters," Soil Sciences, vol. 105, pp. 260–280, 1963.*
A. Ueda, K. Kato, K. Mogl, E. Mroczek and I. Thain, "Silica Removal From Mokai, New Zealand Geothermal Brine by Treatment With Lime and A Cationic Precipitant," Geothermics, Volum 32, No. 1, Feb., 2003, pp. 47–61.

W. Bourcler, S. Martin, B. Viani and C. Bruton, "D v I ping a Pr cess for Comm rcial Sillca Pr ducti n fr mG th rmal Brines," *Geothermal Resources Council Transacti ns*, V lume 25, Aug. 26–29, 2001, pp. 487–491..

M.S. Lin, E.T. Premuzic, W.M. Zhou, and S.D. Johnson, "Min ral R covery: A Pr mising G thermal P w r Producti n Co–Product," *G othermal Resources Council Transactions*, V lume 25, Aug. 26–29, 2001, pp. 497–500.

E.T. Premuzic, M. Lin, M. B hen k, L. Shelenk va, R. Wilk and G J shi–T p, "Proc ssing f Spent G thermal Brin s," *Geothermal Resources Council Transacti ns*, V lume 23, Oct ber 17–20, 1999, pp. 229–234.

K. Kato, A. Ueda, K. Mogi, H. Nakazawa, and K. Shimizu, "Silica Recovery from Sumikawa and Ohnuma Geothermal Brines (Japan) by Addition fCaO and Cati nic Precipitants in a N wly Devel ped Seed Circulation Device," *Geothermics*, Volum 32, N .3, Jun. , 2003, pp. 239–273.

* cited by examiner

*Primary Examiner*—David Sample
(74) *Attorney, Agent, or Firm*—Yale S. Finkle; Gregory F. Wirzbicki

(57) ABSTRACT

Crystalline magnesium silicates are synthesized from silica-containing brines, preferably spent geothermal brines, by mixing the brine with a magnesium-containing compound, adjusting the pH of the resultant mixture between 8.0 and 14, and crystallizing the magnesium silicate from the mixture at a temperature between 50° C. and 200° C. Kerolite is preferably synthesized from brine by adjusting the pH in a range between 9.5 and 10.5 and heating the mixture to between 100° C. and 170° C. to precipitate the crystalline kerolite. The brine remaining after the crystallization step is depleted in silica and can be further processed without significant problems caused by silica scaling.

24 Claims, 1 Drawing Sheet

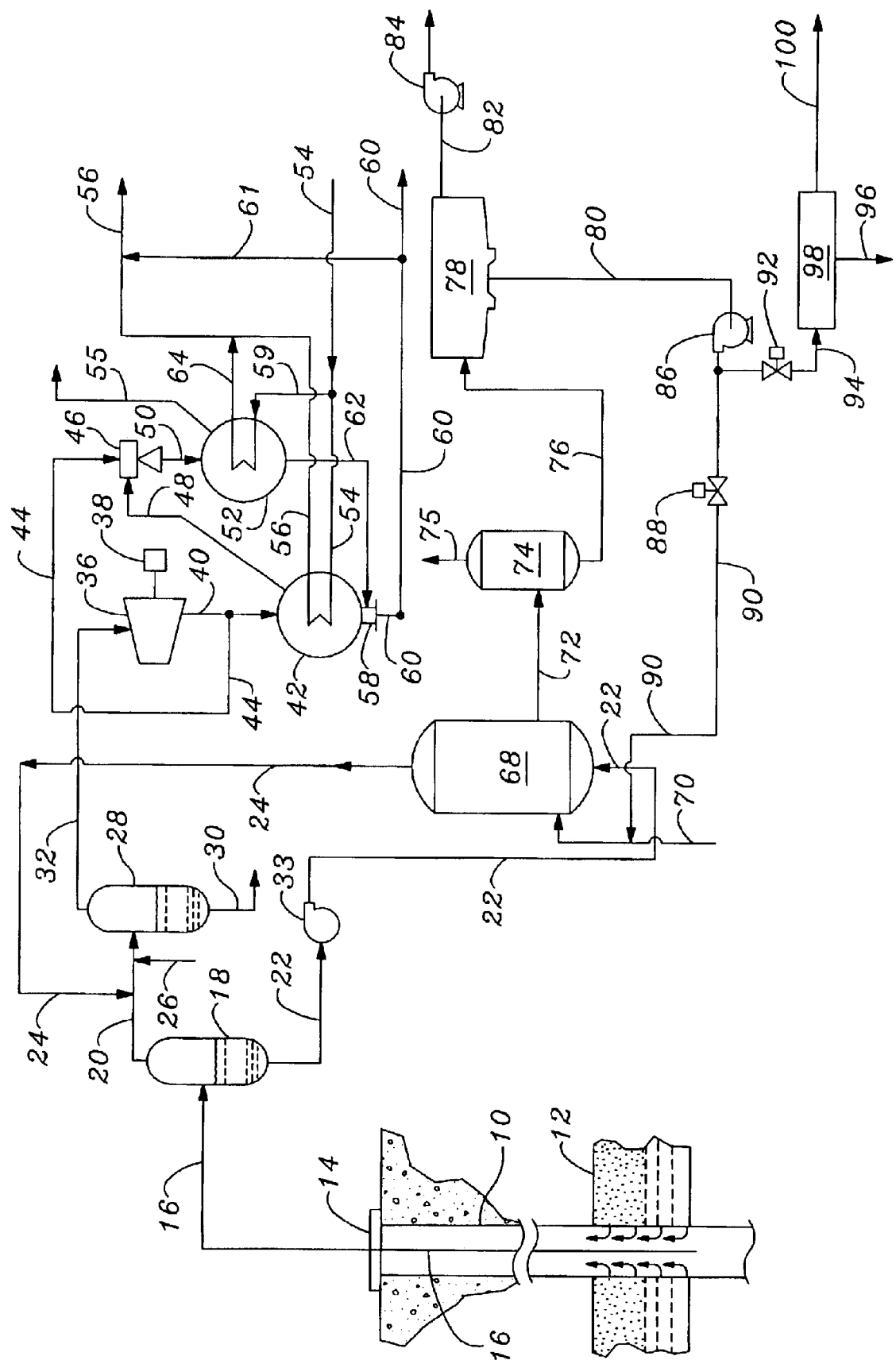

METHOD FOR SYNTHESIZING CRYSTALLINE MAGNESIUM SILICATES FROM GEOTHERMAL BRINE

BACKGROUND OF INVENTION

This invention relates generally to processes or methods for recovering minerals from brine and is particularly concerned with recovering crystalline magnesium silicates from geothermal brine formed during the production of energy from a geothermal fluid.

General processes by which geothermal brine can be used to generate electric power have been known for some time. Geothermal brine from a producing well, having a wellhead temperature over about 180° C. and a wellhead pressure over about 400 psig, for example, can be flashed to a reduced pressure to convert a portion of the brine into steam, which is then fed to a conventional steam turbine-type power generator to produce electricity.

It is generally known that the solubility of most dissolved ions in geothermal brine decreases with a decrease in brine temperature. If dissolved ions are present near their saturation concentration in the brine, a significant reduction in the temperature of the system can result in supersaturation and precipitation of a portion of these saturated ions. Precipitates can combine and deposit as a scale on any solid surface with which they come into contact, such as the vessel or conduit in which the brine is confined.

An especially troublesome component of hot brine is silica, which may be found near saturation concentrations in the form of silicic acid oligomers. These species tend to precipitate out of solution at almost every stage of processing geothermal fluids to recover their energy, either as substantially pure silica or as tightly adherent metal-silica scale having little value. The resultant deposits or scale can plug conduits, injection wells, and the subterranean formation in the vicinity of the injection wells and quickly foul conventional heat-exchangers. Thus, these deposits must be controlled in order to avoid frequent process shutdowns to remove silica-containing scale.

It has been shown that acidifying the brine can significantly reduce its scaling tendencies and allow for a much longer continuous operation of the energy recovery process. However, the acid adds an additional expense to the process and can also cause corrosion and handling problems, such as the introduction of oxygen into an otherwise oxygen-free brine, the embrittlement of equipment, and problems associated with re-injection into a subterranean formation. Thus, alternative methods of controlling silica scale deposition without significantly increasing the cost of power production or creating other brine-handling problems are needed.

SUMMARY OF THE INVENTION

In accordance with the invention, it has now been found that silica precipitation from brine can be controlled or prevented, especially during brine processing to recover energy therefrom and the subsequent re-injection into a subterranean formation to replenish underground aquifers, while at the same time producing a valuable byproduct by using the brine to synthesize crystalline magnesium silicate minerals, such as kerolite. The silica-containing brine, which is usually a geothermal brine produced during extraction of energy from geothermal fluids removed from a subterranean formation, is mixed with a magnesium-containing compound, the pH of the resultant mixture is adjusted to a value between about 8.0 and 14, and a magnesium silicate is crystallized from the mixture at a temperature between about 50° and 200° C. The magnesium silicate, which may have use, for example, in the manufacture of pharmaceuticals, cosmetics and/or drilling muds, is recovered and typically sold to recoup some of the cost of processing the brine, usually to extract energy therefrom. The treated brine may then be further processed or re-injected into a subterranean formation without problems caused by silica precipitation.

The particular type of crystalline magnesium silicate produced in the process or method of the invention typically depends on the amount of the magnesium-containing compound used, the pH of the mixture of brine and magnesium compound and the crystallization temperature. For example, kerolite, which is a crystalline magnesium silicate clay frequently having the chemical formula $Mg_3Si_4O_{10}(OH)_2 \cdot H_2O$ and used in the pharmaceutical and cosmetics industries, is synthesized by using enough of the magnesium-containing compound such that there is about a ¾ mole of magnesium for every mole of silica in the mixture of brine and magnesium compound, adjusting the pH of the mixture to a value between about 9.5 and about 10.5, and crystallizing the mixture at a temperature between about 100° C. and about 170° C. Other crystalline magnesium silicates, including specialty clays, can be made by changing the synthesis conditions and the amounts of reactants. Examples of such magnesium silicates include, among others, sepiolite, talc, stevensite, polygorskite, saponite, and hectorite.

BRIEF DESCRIPTION OF THE DRAWING

The drawing is a schematic flow diagram of a portion of a geothermal power plant in which an embodiment of the method of the invention is used to synthesize a crystalline magnesium silicate during the production of geothermal fluids and their processing to extract energy and generate electrical power. It should be noted that the drawing is a simplified process flow diagram and therefore does not show many types of equipment, such as heat exchangers, valves, separators, heaters, compressors, etc., not essential for understanding the invention by one of ordinary skill in the relevant art.

DETAILED DESCRIPTION OF THE INVENTION

The drawing shows a portion of a geothermal power plant in which geothermal fluids are removed from a production well and processed to produce steam and hot brine. The steam is used to generate electricity, and the brine is used to synthesize a crystalline magnesium silicate before the brine is further treated or re-injected into the ground. The process depicted in the drawing is a preferred embodiment of the process of the invention in which geothermal brine produced during the extraction of energy from geothermal fluids removed from a subterranean formation is used to make a crystalline magnesium silicate. It will be understood, however, that the process of the invention is not limited to use in geothermal power plants but can be used in any situation in which it is desired to synthesize a crystalline magnesium silicate from a brine containing silica. As used herein "crystalline magnesium silicate" refers to any crystalline silicate compound containing magnesium, silicon and oxygen either alone or in combination with other elements.

In the process depicted in the drawing, a high temperature and high pressure mixture of steam, noncondensable gases, e.g., hydrogen sulfide and carbon dioxide, and brine is removed from geothermal reservoir 12 through production or extraction well 10 and wellhead 14 via line 16 and passed into flash vessel 18. In some cases it may be desirable to pass the two phase mixture in line 16 through a dual phase turbine (not shown in the drawing) to generate electricity prior to introducing the mixture into flash vessel 18.

The brine in the geothermal fluids brought to the surface in production well 10, which fluids typically have a temperature between 250° F. to about 600° F., usually contains dissolved solids including silicon-containing components, such as silicic acid, oligomers of silicic acid and silicates, which components are capable of precipitation to form silica scale as the brine is cooled for further processing and/or re-injection into the ground. Thus, it is treated in accordance with the method of the invention to remove the silica.

The geothermal fluids in line 16 are introduced under pressure, usually between about 200 and 1,000 psig, into flash vessel or separator 18. Here, the brine is flashed to a substantially lower pressure, such as between 40 and 200 psig, to release more steam. The noncondensable gases including hydrogen sulfide and carbon dioxide are separated or stripped from the geothermal brine and removed overhead of the flash vessel through line 20 while the brine is removed from the bottom of the flash vessel through conduit 22.

The steam and noncondensable gases removed overhead of flash vessel 18 through line 20 are mixed with additional steam introduced into line 20 via line 24. The combined streams are then mixed with water introduced into line 20 through line 26, and the resultant mixture is passed into steam scrubber 28. Here the water injected into line 20, which water dissolves chloride and other impurities from the steam, and any residual brine are separated from the steam and noncondensable gases and removed through conduit 30. The remaining brine-free and chloride-free steam and noncondensable gases are discharged overhead of scrubber 28 through conduit 32 and passed into steam turbine 36 which drives generator 38 to produce electricity. The steam condensate produced in the turbine, steam and noncondensable gases exit the turbine through line 40 and are passed into main condenser 42. A small slip stream of steam and noncondensable gases is diverted from conduit 40 through line 44 to steam eductor 46, which is powered by noncondensable gases removed from the main condenser through line 48, and then through line 50 into second or inner condenser 52.

In main condenser 42, which is preferably a shell and tube heat exchanger, the steam and noncondensable gases including hydrogen sulfide exiting turbine 36 are placed in indirect heat exchange with cooled condensate from an open, cascade-type, condensate cooling tower, not shown in the drawing, which cooled condensate is passed by means of a pump (also not shown in the drawing) from the sump region of the cooling tower through line 54 into the main condenser 42. Sufficient heat is transferred from the steam and noncondensable gases in the main condenser to the cooled condensate such that the steam is condensed and the temperature of the cooled condensate is increased, usually by between 10° F. and 50° F. The heated condensate is removed from the main condenser through line 56 and returned to the cooling tower for cooling before reuse.

The steam condensate produced in main condenser 42 is passed from the condenser through outlet region 58 into conduit 60. Additional steam condensate produced in inner condenser 52 by indirect heat exchange between the steam and noncondensable gases introduced into the condenser through line 50 and the water from the cooling tower introduced into the inner condenser via conduits 54 and 59 is removed from the condenser through line 62 and mixed with steam condensate from the main condenser 42 in outlet region 58. The water passed into the inner condenser through line 59 is increased in temperature by indirect heat exchange with the steam and noncondensable gases, and the resultant heated water is removed from the inner condenser through line 64 and passed into line 56 for return to the cooling tower.

At least a portion of the steam condensate from main condenser 42 and inner condenser 52, which is combined in outlet region 58 of the main condenser, is passed through conduits 60 and 61 into conduit 56 for use as makeup water to the cooling tower.

Over time, the concentration of salts in the cooling tower water increases to a level that may cause corrosion. To avoid such a buildup of salts, a small portion of the circulating condensate (normally referred to as blowdown) is removed, either periodically or continuously, from the cooling tower and disposed of, usually via a re-injection well. Depending on the situation, this blowdown stream may be mixed prior to disposal with any condensate in line 60 that is not passed into lines 61 and 56 for returning to the cooling tower.

Noncondensable gases including hydrogen sulfide and carbon dioxide are discharged from the main condenser 42 through conduit 48 into eductor 46 where they are mixed with the steam and noncondensable gases in line 44 and then passed through conduit 50 into inner condenser 52. Here, additional steam is condensed from the gases to produce a substantially dry mixture of noncondensable gases which are removed from the inner condenser through line 55. Since these gases contain a substantial amount of hydrogen sulfide, they are normally treated to remove at least a portion of this gas before being vented to the atmosphere.

The brine removed from flash vessel 18 through line 22 typically has a temperature between about 125° C. and 200° C. and a pressure ranging from about 40 to about 200 psig. The brine also has a high concentration of silica components that will precipitate out in the form of solid scale as the temperature and pressure of the brine decreases. The resultant scale tends to plug equipment used to further process the brine for additional energy recovery and/or the injection well used to return spent brine to the subterranean formation from which the hot geothermal fluids were originally taken.

It has now been found that this undesirable formation of silica-containing scale can be substantially abated by mixing the brine with a magnesium-containing compound under certain temperature and pH conditions in order to synthesize crystalline magnesium silicates prior to further processing the brine or re-injecting it into the ground. In the synthesis process, silica in the brine reacts with magnesium in the magnesium-containing compound to form a magnesium silicate, which is then crystallized from the synthesis mixture. The magnesium silicate is then recovered and sold, and the silica-depleted brine is further processed without significant problems caused by precipitated silica scale.

Referring again to the drawing, the brine in line 22 is passed by pump 33 into the bottom of crystallizer 68 where it is mixed with a magnesium-containing compound and seed crystals introduced into the crystallizer through line 70. The seed crystals are passed through line 90 into line 70 where they are mixed with the magnesium-containing compound. The pressure of the brine in vessel 68 is decreased to between about 2.5 and 35 psig, which decrease causes the brine to flash and produce additional steam. This additional steam is removed overhead of crystallizer 68, passed through conduit 24 and mixed with steam exiting flash vessel 18 in line 20.

Many different types of crystalline magnesium silicates can be synthesized in crystallizer 68. Examples of such magnesium silicates include sepiolite, polygorskite, kerolite, stevensite, talc, saponite, hectorite, minnesotaite, illite, smectite, willemseite and calciotaic. The primary group of magnesium silicates formed in the crystallizer has the general formula $$(Mg_{3-x}, M_x)Si_4O_{10}(OH)_2 \cdot nH_2O$$

where x is a number from 0 to 3; M is a divalent element selected from the group consisting of Fe, Cu, Ni, Ca, Co, Mn, Sr, Ba, and Zn; and n is a number from 0 to 2. Although, as shown, these magnesium silicates can contain other cations, such as those listed above, it is normally preferred that x be 0 so that the magnesium silicates are free of these cations. Common members of this magnesium silicate group include kerolite, stevensite and talc.

Another group of magnesium silicates that can be formed in the crystallizer is characterized by the formula $$Mg_xSi_yO_z(OH)_a \cdot nH_2O$$

where x is a number from 3 to 5; y is a number from 4 to 8; z is a number from 10 to 21; a is a number between 0 and 22; and n is a number from 0 to 8. Common members of this group not only include kerolite, stevensite and talc, but also sepiolite and polygorskite having the respective formulas $Mg_4Si_6O_{15}(OH)_2 \cdot 4H_2O$ and $Mg_5Si_8O_{20}(OH)_2 \cdot 8H_2O$.

The primary factors that determine the actual type of magnesium silicate formed in crystallizer 68 are the amount of the magnesium compound introduced into the vessel, the temperature of the crystallization and the pH maintained during crystallization. In addition, the pressure should normally be above atmospheric, preferably above about 2.5 psig and generally below about 35 psig.

In general any organic or inorganic magnesium-containing compound can be mixed with the brine in crystallizer 68. Examples of inorganic compounds that can be used include magnesium chloride, magnesium hydroxide, magnesium sulfate, magnesium bromide, magnesium oxide, magnesium carbonate, magnesium bicarbonate and magnesium nitrate, while examples of organic compounds that can be used include magnesium formate, magnesium butyrate, magnesium propionate and magnesium acetate. The amount of the magnesium compound is one factor that helps to determine the type of magnesium silicate formed. For example, if kerolite of the formula $Mg_3Si_4O_{10}(OH)_2 \cdot H_2O$ is the desired product, a sufficient amount of the magnesium compound is introduced into the crystallizer so that the mole ratio of magnesium to silica in the brine is 3:4. On the other hand, if it is desired to synthesize sepiolite of the formula $Mg_4Si_6O_{15}(OH)_2 \cdot 4H_2O$, a sufficient amount of the magnesium compound is introduced into the crystallizer so that the mole ratio of magnesium to silica in the brine is 2:3.

The temperature and pH conditions in the crystallizer are also important in determining the type of crystalline magnesium silicate that is formed. For example, if kerolite, which is a hydrated form of talc, is the desired product, the temperature is normally controlled between about 100° C. and 170° C. and the pH is typically maintained between about 9.5 and 10.5. Other forms of talc, such as talc of the formula $Mg_3Si_4O_{10}$, are typically formed at a pH between about 9 and 12 and at temperatures above about 170° C. where waters of hydration are not formed. Stevensite of the formula $Mg_3Si_4O_{10}(OH)_2 \cdot 1.5H_2O$, on the other hand, is usually produced at a pH between about 8 and 12 and temperatures below about 100° C.

The pH of the reaction mixture in crystallizer 68 is typically raised into the desired range by adding a base, such as ammonia, calcium hydroxide, calcium oxide or sodium hydroxide. However, magnesium hydroxide is normally the preferred base for use because, in addition to raising the pH, it also supplies the magnesium needed to react with silica to form the desired magnesium silicate.

Once the magnesium compound and silica-containing brine are mixed together in the cyrstallizer and the temperature and pH are adjusted into the desired ranges, the magnesium silicate almost immediately begins to crystallize from solution. Typically, the mixture in the crystallizer is maintained at the desired reaction conditions for a time ranging between about 30 seconds and 30 minutes, usually between about 1.0 and 15 minutes.

After the magnesium silicate is crystallized, the resultant mixture of brine and particulate magnesium silicate is removed from crystallizer 68 and passed under pressure through line 72 to atmospheric flash vessel 74. Here the mixture is flashed to atmospheric pressure so as to create additional steam, which is discharged from vessel 74 through conduit 75 into the atmosphere. Alternatively, the steam can be used for facility heating or other heating purposes. Crystallization of magnesium silicate from the brine may continue to some extent in the flash vessel.

From vessel 74, the brine, with the magnesium silicate suspended therein, is passed through conduit 76 into clarifier 78 where the suspended solids settle from the brine and are removed with some brine from the bottom of the clarifier through line 80. The overflow from the clarifier, which consists primarily of brine and a small amount of particulates, is removed through conduit 82 and passed via pump 84 to other equipment, not shown in the drawing, where the overflow is further processed to remove the particulates before the brine is re-injected into reservoir 12. Because a large amount of silica originally in the brine was removed by reaction with the magnesium compound in crystallizer 68, normally no significant problems arising from silica precipitation are encountered when the brine is subjected to this further processing or re-injected into the reservoir.

A small portion of the material removed from the clarifier through line 80, which material is primarily the crystalline magnesium silicate formed in crystallizer 68, is passed by pump 86 through valve 88 and lines 90 and 70 into crystallizer 68 to serve as seed material for the crystallization occurring therein. The remainder of the material is passed by pump 86 through valve 92 and conduit 94 to filter press 98 for dewatering. Valves 88 and 92 control the division of the magnesium silicate-brine mixture between the crystallizer and the filter press in accordance with operational requirements. Brine removed from the mixture is passed through line 100 for additional treatment or disposal.

The dewatered wet product formed in filter press 98 is removed therefrom through conduit 96. This wet material is nearly pure magnesium silicate and is passed to a steam-heated kiln, not shown in the drawing, where it is dried. The resultant dry magnesium silicate is then transported off-site for commercial refining and use. A portion of the cost of generating electricity in generator 38 can be off-set by selling the dried magnesium silicate.

The nature and objects of the invention are further illustrated by the following examples, which are provided for illustrative purposes only and not to limit the invention as defined by the claims. The examples show that (1) amorphous or poorly crystalline magnesium silicates are produced when a mixture of a magnesium compound and brine is heated at relatively low temperatures and atmospheric pressure, (2) crystalline magnesium silicates are formed when a mixture of a magnesium compound and brine is heated at higher temperatures under pressure and (3) kerolite is the principal crystalline magnesium silicate formed at the higher temperatures when the pH is maintained between about 9.5 and about 10.5.

EXAMPLE 1

A simulated brine solution was prepared by dissolving silicic acid powder in a 0.15 molal sodium chloride solution at a pH of 10. Equal portions of this solution, which contained a dissolved silica concentration of 1,000±100 ppmw, were placed in teflon pans and heated under atmospheric pressure to 90° C. while being stirred. A slight stochiometric excess of saturated magnesium chloride solution was added dropwise to the stirred solutions while the pH of the simulated brine was continuously adjusted to 9.5 by adding concentrated sodium hydroxide solution. After the desired amount of magnesium had been added to the various portions of simulated brine, the resultant gelatinous mixtures were stirred for 1 hour at 90° C. The resultant mixtures were passed through 12 micron filter paper, and the filtered solids were washed with deionized water to remove entrained salts. The washed solids were dried overnight at 120° C., and the resultant buff white solids were then subjected to X-ray diffraction using a Siemens D-500 X-ray diffractometer with graphite crystal monochromatized Cu-K alpha radiation. The resultant diffractograms were studied and compared to those of kerolite, sepiolite, and talc. It was concluded from this comparison that the synthesized magnesium silicates were primarily amorphous or at best microcrystalline. Kerolite, sepiolite, and talc feature a prominent X-ray diffraction band at a d-spacing of about 4.5 Angstroms. Such a band was not observed in any of the diffractograms of the synthesized magnesium silicates.

EXAMPLE 2

Geyser water having the analysis shown in Table 1 below and collected at El Tatio in Chile was charged into a 1 liter Hastelloy C-276 pressure reactor.

TABLE 1

Water Analyses (ppmw)

| Analyte | El Tatio Geyser Water | Salak Brine |
|---|---|---|
| pH | 7.3 units | 6.6 units |
| Al | 0.31 | 0.1 |
| As | 36 | 15 |
| B | 140 | 385 |
| Ca | 240 | 172 |
| Cs | 12.5 | 3 |
| Cu | 0.01 | <0.1 |
| Fe | 0.21 | 0.6 |
| K | 170 | 860 |
| Li | 30.3 | 14 |
| Mg | 0.65 | 0.1 |
| Mn | 0.06 | 0.14 |
| Na | 3,600 | 4200 |
| Pb | <0.003 | <0.1 |
| Rb | 4.2 | 4.9 |
| Sb | 1.9 | <0.1 |
| $SiO_2$ | 96 | 170 |
| Zn | <0.02 | <0.1 |
| Cl | 5,600 | 8,600 |

TABLE 1-continued

Water Analyses (ppmw)

| Analyte | El Tatio Geyser Water | Salak Brine |
|---|---|---|
| $CO_{2(aq)}$ | NA | NA |
| F | 5 | <2 |
| $HCO_3$ | 46 | 69 |
| $NH_3$ | 1.5 | 5.3 |
| $SO_4$ | 37 | 19 |

Reagent grade silicic acid (hydrated silica) powder (1.3 grams) was added to the reactor and the pH of the mixture was adjusted by adding sodium hydroxide. The headspace in the reactor was purged with nitrogen to exclude oxygen. The reactor was sealed, heated to 250° C., and the mixture stirred to saturate the water with dissolved silica in an amount of 1300 ppmw. The solution temperature was then rapidly reduced to 150° C. and a saturated magnesium chloride solution was injected into the reactor. The resultant mixture was stirred for 1 hour at 100° C and atmospheric pressure, removed from the reactor, and passed through 12 micron filter paper. The filtered solids were washed with deionized water to remove entrained salts, and the washed solids were dried overnight at 120° C. Precipitates A, B and C were obtained from three different runs at a different final pH for each run. About 1.5 grams of each of the buff white precipitates were analyzed by X-ray fluorescence and X-ray diffraction using a Siemens D-500 X-ray diffractometer with graphite crystal monochromatized Cu-K alpha radiation. The chemical analyses of the precipitates are shown in Tables 2 and 3 below with Table 3 also containing data derived from the diffractograms of the three precipitates and from the diffractograms of four reference magnesium silicates, i.e., sepiolite, talc, stevensite and kerolite.

TABLE 2

Bulk Chemical Analyses of Major Elements in Precipitates (Wt %)

| Element | Precipitate A | Precipitate B | Precipitate C | Precipitate D |
|---|---|---|---|---|
| $Na_2O$ | 1.87 | 0.74 | 1.16 | 1.26 |
| MgO | 18.2 | 29.3 | 26.7 | 29.5 |
| $Al_2O_3$ | 1.07 | <0.03 | <0.03 | 0.08 |
| $SiO_2$ | 56.4 | 60.7 | 54.5 | 43.4 |
| S | <0.05 | <0.05 | <0.05 | <0.05 |
| Cl | 0.04 | <0.02 | 0.05 | 0.06 |
| $K_2O$ | 0.27 | 0.05 | 0.11 | 0.34 |
| CaO | 7.83 | 0.42 | 6.59 | 4.32 |
| $Fe_2O_3$ | 0.29 | 0.08 | <0.01 | 0.03 |
| BaO | 0.65 | <0.01 | 0.01 | <0.01 |
| As | 0.084 | 0.1 | 0.36 | 0.0564 |
| $H_2O$ | 10.3 | 8.3 | 11.7 | 14.9 |

TABLE 3

Mineral Comparisons

| Mineral | Syn pH | Weight % MgO | Weight % SiO$_2$ | LOI (H$_2$O) | Prominent X-Ray Diffraction Peaks; d-spacing Å (relative intensity) | | | | |
|---|---|---|---|---|---|---|---|---|---|
| Sepiolite a* | | 26.8 | 53.3 | 19.9 | 15 (1) | 5.2 (0.2) | 3.1 (0.3) | 2.58 (0.6) | 1.6 (0.1) |
| Sepiolite b* | | 24.9 | 55.7 | 19.5 | 12.1 (1) | 4.4 (0.35) | 3.5 (0.2) | 2.6 (0.6) | |
| Sepiolite c* | | 28.5 | 63.6 | 17.5 | 12.1 (1) | 4.6 (0.4) | 3.3 (0.1) | 2.6 (0.7) | 1.5 (0.1) |
| Talc a* | | 31.9 | 63.4 | 4.7 | 9.4 (1) | 4.3 (0.1) | 3.1 (0.5) | 2.5 (0.7) | 1.5 (0.1) |
| Talc b* | | 31.9 | 63.3 | 4.5 | 9.35 (1) | 4.6 (0.45) | | | 1.53 (0.55) |
| Kerolite (theoretical)* | | 30.5 | 60.5 | 9.1 | 9.6 (1) | 4.5 (0.3) | 3.2 (0.25) | 2.6 (0.55) | 1.5 (0.4) |
| Kerolite (Kenya)* | | 30.2 | 58.7 | 8.6 | 10.3 (1) | 4.56 (0.25) | 3.18 (0.2) | 2.57 (0.6) | 1.53 (0.45) |
| Stevensite* | | 28.6 | 62.9 | 12.1 | 15.5 (1) | 4.53 (0.35) | | | 1.52 (0.15) |
| Precipitate A | 11 | 18.2 | 56.4 | 10.3 | *** | 3.08 (1) | 2.86 (0.5) | 2.37 (0.45) | |
| Precipitate B | 10 | 29.3 | 60.7 | 8.3 | *** | 4.52 (0.4) | 3.1 (0.3) | 2.56 (0.7) | 1.53 (1) |
| Precipitate C | 8.7 | 26.7 | 54.5 | 11.7 | 4.5 (0.2) | 4.2 (0.4) | 3.2 (0.5) | 2.55 (1) | 1.53 (1) |
| Precipitate D | NR** | 29.5 | 43.4 | 14.9 | 10.9 (0.7) | 4.3 (0.3) | 3.0 (0.5) | 2.6 (1) | 1.53 (1) |

*Data from the literature
**Not Recorded
***Peak could not be resolved due to fewer clay layers being present as compared to kerolite found in nature Obviously, because precipitates A, B and C had diffractograms with distinct peaks as shown in Table 3, these products, unlike those synthesized in Example 1, were crystalline in nature. A comparison of the magnesium oxide, silica, and water contents of the three precipitates with the corresponding contents in the reference magnesium silicates indicates that precipitate A probably does not contain any sepiolite, talc, stevensite or kerolite since its magnesium oxide content is only 18.2 weight percent, which is much less than the 24 to 32 weight percent of the reference minerals. This conclusion is supported by comparing the diffractogram data of precipitate A with that of the reference magnesium silicates. Precipitate A has peaks at d-spacings of 3.08, 2.86 and 2.37 Angstroms and no peak at a d-spacing of about 1.5, whereas the reference minerals have peaks at d-spacings of about 4.5, 3.2 and 1.5. Based on these comparisons it does not appear that precipitate A contains kerolite or any of the other reference magnesium silicates.

Precipitate B, on the other hand, appears to be substantially all kerolite. Its content of magnesium oxide, silica and water is very similar to that of the two reference kerolites, and its diffractogram shows peaks at d-spacings of about 4.5, 3.1, 2.6 and 1.5 Angstroms as is the case with the diffractograms of the reference kerolites.

A comparison of the data for precipitate C to that of the reference minerals leads to the conclusion that this precipitate probably contains some kerolite in combination with an unidentified crystalline material. Precipitate C's water content is closest to that of kerolite and its diffraction pattern shows peaks, as does those of the reference kerolites, at d-spacings of about 4.5, 3.2, 2.6 and 1.5 Angstroms. However, its diffraction pattern also exhibits a peak at 4.2 Angstroms, which peak is not shown in any of the reference diffractograms, and no peak at a d-spacing of about 10 Angstroms, which d-spacing has a peak in the diffractogram for kerolite, indicating the presence of another material. The intensity of the peaks at d-spacings of 2.5 and 1.5 in the diffractogram of precipitate C are about equal, which is true for those of the reference kerolites but not the other reference magnesium silicates shown in Table 3. This fact further supports the conclusion that precipitate C contains at least some kerolite as opposed to talc, sepiolite or stevensite.

The fact that precipitates A, B and C were synthesized, respectively, at a pH of 11, 10, and 8.7, and the fact that precipitate B was primarily kerolite show that the pH of the synthesis is an important factor in obtaining kerolite as opposed to other magnesium silicates. Thus, when it is desired to preferentially make kerolite, the synthesis should be carried out at a pH between about 9.5 and about 10.5.

EXAMPLE 3

A fourth run was conducted in the pressure reactor of Example 2 following the procedure discussed in Example 2 but using an actual brine obtained from the Salak field in Indonesia. The composition of the brine is shown in Table 1, and the results of the X-ray fluorescence and X-ray diffraction analyses of the precipitate D recovered in the run are shown in Tables 2 and 3 above.

Comparing the data for precipitate D with that for the reference magnesium silicates leads to the conclusion that the precipitate is primarily all kerolite. Like kerolite, precipitate D has a magnesium oxide content of about 30 weight percent and its diffractogram exhibits peaks near the d-spacings exhibiting peaks in the diffractograms of kerolite, i.e., d-spacings of about 10, 4.5, 3.2, 2.6 and 1.5.

Although this invention has been described by reference to several embodiments of the invention, it is evident that many alterations, modifications and variations will be apparent to those skilled in the art in light of the foregoing description. Accordingly, it is intended to embrace within the invention all such alternatives, modifications and variations that fall within the spirit and scope of the appended claims.

We claim:

1. A method for synthesizing a crystalline magnesium silicate from a silica-containing brine comprising:
   (a) mixing said brine with a magnesium-containing compound to form a mixture;
   (b) adjusting the pH of said mixture to a value within the range of about 8.0 to about 14 pH units; and
   (c) crystallizing said magnesium silicate from said mixture at a temperature between about 50° C. and about 200° C.

2. The method defined by claim 1 wherein said brine comprises a geothermal brine.

3. The method defined by claim 1 wherein said crystalline magnesium silicate is selected from the group consisting of sepiolite, polygorskite, kerolite, stevensite, talc, saponite, hectorite, minnesotaite, illite, smectite, willemseite and calciotalc.

4. The method defined by claim 1 wherein said crystalline magnesium silicate has the following formula $$(Mg_{3-x}M_x)Si_4O_{10}(OH)_2 \cdot nH_2O$$

where x is a number from 0 to 3; M is a divalent element selected from the group consisting of Fe, Cu,. Ni, Ca, Co, Mn, Sr, Ba, and Zn; and n is a number from 0 to 2.

5. The method defined by claim 4 wherein x is 0.

6. The method defined by claim 4 or 5 wherein said crystalline magnesium silicate is selected from the group consisting of kerolite, stevensite, and talc.

7. The method defined by claim 1 wherein said crystalline magnesium silicate has the following formula $$Mg_xSi_yO_z(OH)_a \cdot nH_2O$$

where x is a number from 3 to 5; y is a number from 4 to 8; z is a number from 10 to 21; a is a number between 0 and 22; and n is a number from 0 to 8.

8. The method defined by any one of claims 1–7 wherein said magnesium-containing compound is selected from the group consisting of magnesium chloride, magnesium hydroxide,.magnesium sulfate, magnesium formate, magnesium acetate, and magnesium nitrate.

9. The method defined by any one of claims 4–7 wherein said pH is between about 8.5 and about 11.0 and said crystallization temperature is between about 100° C. and about 200° C.

10. A method for synthesizing a crystalline magnesium silicate from a silica-containing geothermal brine comprising:
    (a) mixing said brine with a magnesium-containing inorganic compound to form a mixture;
    (b) adjusting the pH of said mixture to a value within the range of about 8.5 to about 11 pH units; and
    (c) crystallizing said magnesium silicate from said mixture at a temperature between about 50° C. and about 200° C.

11. The method defined by claim 10 wherein said inorganic magnesium-containing compound is selected from the group consisting of magnesium chloride, magnesium hydroxide, magnesium sulfate, and magnesium nitrate.

12. The method defined by claim 10 or 11 wherein said magnesium silicate comprises kerolite, said pH is between about 9.5 and about 10.5, and said crystallization temperature is between about 100° C. and 170° C.

13. The method defined by claim 12 wherein said kerolite has the chemical formula $Mg_3Si_4O_{10}(OH)_2 \cdot H_2O$.

14. The method defined by claim 10 or 11 wherein said magnesium silicate comprises talc, said pH is between about 9 and about 12, and said crystallization temperature is greater than about 170° C.

15. The method defined by claim 14 wherein said talc has the chemical formula $Mg_3Si_4O_{10}(OH)_2$ 16. The method defined by claim 10 or 11 wherein said magnesium silicate comprises stevensite, said pH is between about 8 and about 12 and said crystallization temperature is less than about 100° C.

17. The method defined by claim 16 wherein said stevensite has the chemical formula $Mg_3Si_4O_{10}(OH)_2 \cdot 1.5H_2O$.

18. A method for synthesizing a crystalline magnesium silicate from a silica-containing brine obtained during the production of energy from a silica-containing geothermal fluid which comprises:
    (a) separating said silica-containing geothermal fluid into steam and said silica-containing brine;
    (b) extracting energy from said steam;
    (c) mixing said silica-containing brine with a magnesium-containing compound to form a mixture;
    (d) adjusting the pH of said mixture to a value within the range of about 8.5 to about 11 pH units; and
    (e) precipitating said crystalline magnesium silicate from said mixture at a temperature between about 50° C. and about 200° C.

19. The method defined by claim 18 wherein said crystalline magnesium silicate is selected from the group consisting of sepiolite, polygorskite, kerolite, stevensite, talc, smectite saponite, hectorite, minnesotaite, illite, smectite, willemseite and calciotalc.

20. The method defined by claim 18 wherein the pH in step (d) is adjusted by adding a base to the mixture formed in step (c).

21. The method defined by claim 20 wherein said base is selected from the group consisting of ammonia, calcium hydroxide, calcium oxide and sodium hydroxide.

22. The method defined by claim 18 wherein said magnesium-containing compound used to form said mixture in step (c) comprises magnesium hydroxide and said magnesium hydroxide also serves to adjust the pH in step (d).

23. The method defined by claim 18 wherein said crystalline magnesium silicate comprises kerolite.

24. The method defined by claim 23 wherein said pH is between about 9.5 and 10.5 and said precipitation temperature is between about 100° C. and about 170° C.

* * * * *